Feb. 20, 1940. R. H. SMITH Re. 21,368

WATER BLOCK OR DAM FORMING DEVICE

Original Filed April 24, 1935 3 Sheets-Sheet 1

Russell H. Smith
INVENTOR.

BY J. Preston Swecker
his ATTORNEY.

Feb. 20, 1940. R. H. SMITH Re. 21,368
WATER BLOCK OR DAM FORMING DEVICE
Original Filed April 24, 1935 3 Sheets-Sheet 2
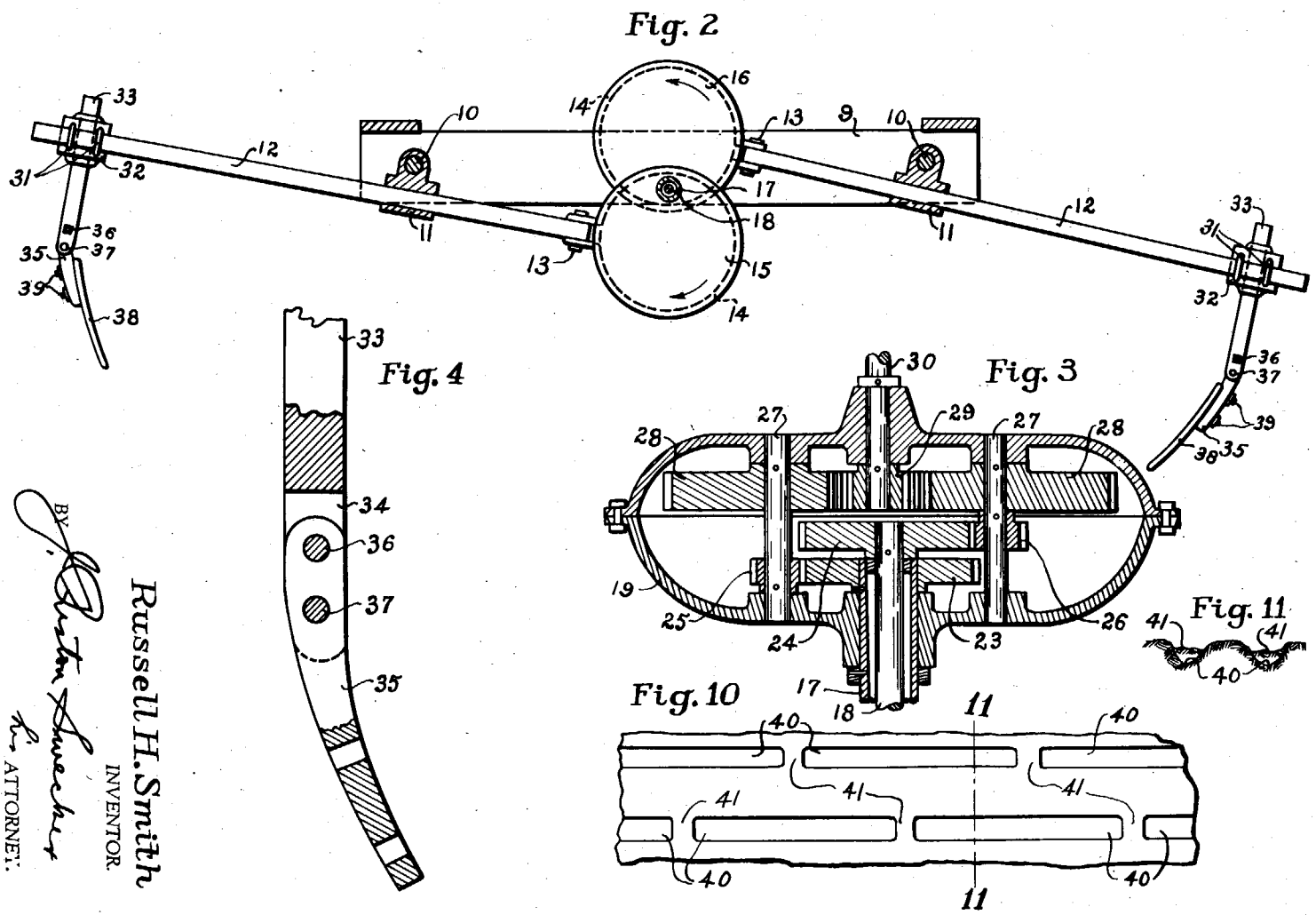
Russell H. Smith
INVENTOR.
BY J. Ashton Swecker
his ATTORNEY.

Feb. 20, 1940. R. H. SMITH Re. 21,368
WATER BLOCK OR DAM FORMING DEVICE
Original Filed April 24, 1935 3 Sheets-Sheet 3
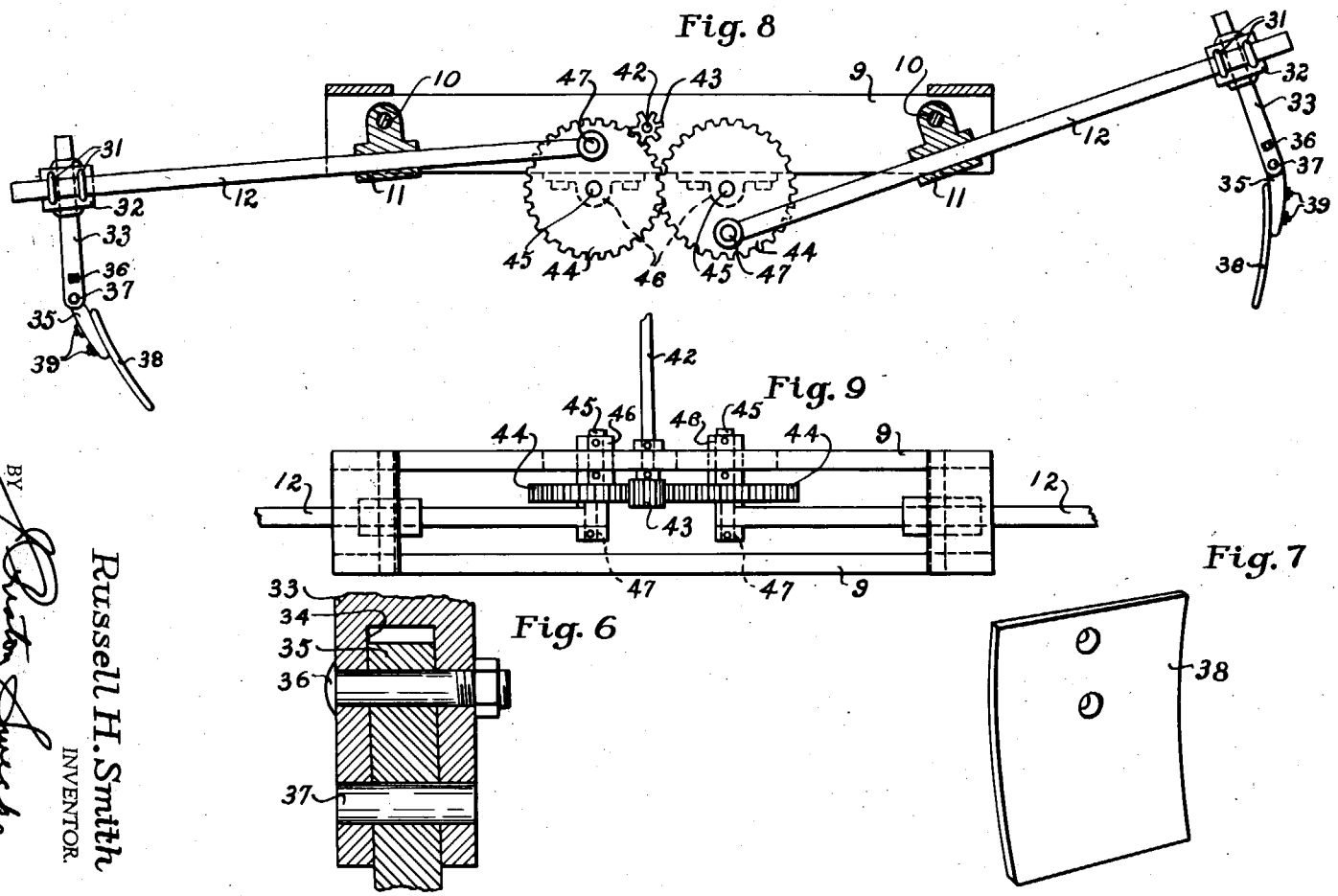
Russell H. Smith
INVENTOR.
BY J. Preston Swecker
his ATTORNEY.

Reissued Feb. 20, 1940

Re. 21,368

UNITED STATES PATENT OFFICE 21,368

WATER BLOCK OR DAM FORMING DEVICE

Russell H. Smith, Quanah, Tex., assignor of one-half to Alfred A. Lindsey, ten per cent to Robert R. McDaniel, and one per cent to Earl Stine, all of Quanah, Tex.

Original No. 2,043,075, dated June 2, 1936, Serial No. 18,019, April 24, 1935. Application for reissue April 23, 1937, Serial No. 138,672

11 Claims. (Cl. 97—55)

This invention relates to a water block or dam forming machine for use in the cultivation of land.

As is well known, in the cultivation of arid land, the practice is to provide checks, water blocks or, as otherwise termed, dams across the furrows to retain the water equally distributed, and also to guard against erosion and the washing of the seed along the trenches. During a rain, water is trapped in the basins formed in the furrows by the dams, thereby providing means for the retention of moisture and the prevention of soil erosion due to washing that would take place in unobstructed furrows. When the furrows are unobstructed, water either washes away the top soil or causes the light fertile soil to be separated out and deposited on the surface to be blown away by the wind. By forming dams in the furrows, the valuable and fertile top soil is conserved and the crop is benefited by the additional moisture.

In accordance with the present invention, a machine of the character suggested is provided whereby the dirt used in making the dams is shoveled into the trenches from opposite sides thereof so as not to unduly increase the depth of the trenches as results from the now existing forms of machines provided for this purpose.

A further object of the invention is to provide a machine of this character which can be readily applied to any suitable type of farm tractor, and which is otherwise characterized by simplicity of construction and number of parts, operation and application of the machine to the tractor.

The invention together with its objects and advantages will be best understood from a study of the following description taken in connection with the accompanying drawings wherein:

Fig. 2 is a sectional view taken substantially on the line 2—2 of Fig. 1;

Fig. 3 is a horizontal sectional view taken through a transmission forming part of the invention;

Fig. 4 is a fragmentary longitudinal sectional view showing the manner of connecting a shovel shank to a foot member;

Fig. 6 is a fragmentary detail sectional view of the connection between the shovel shank and its foot member;

Fig. 7 is a perspective view of a shovel;

Fig. 8 is a view somewhat similar to Fig. 2 illustrating a slightly modified form of the invention;

Fig. 9 is a top plan view of the structure shown in Fig. 8;

Fig. 10 is a fragmentary plan view showing a dam arrangement in accordance with the present invention;

Fig. 11 is a detail view taken substantially on the line 11—11 of Fig. 10;

Figure 1:
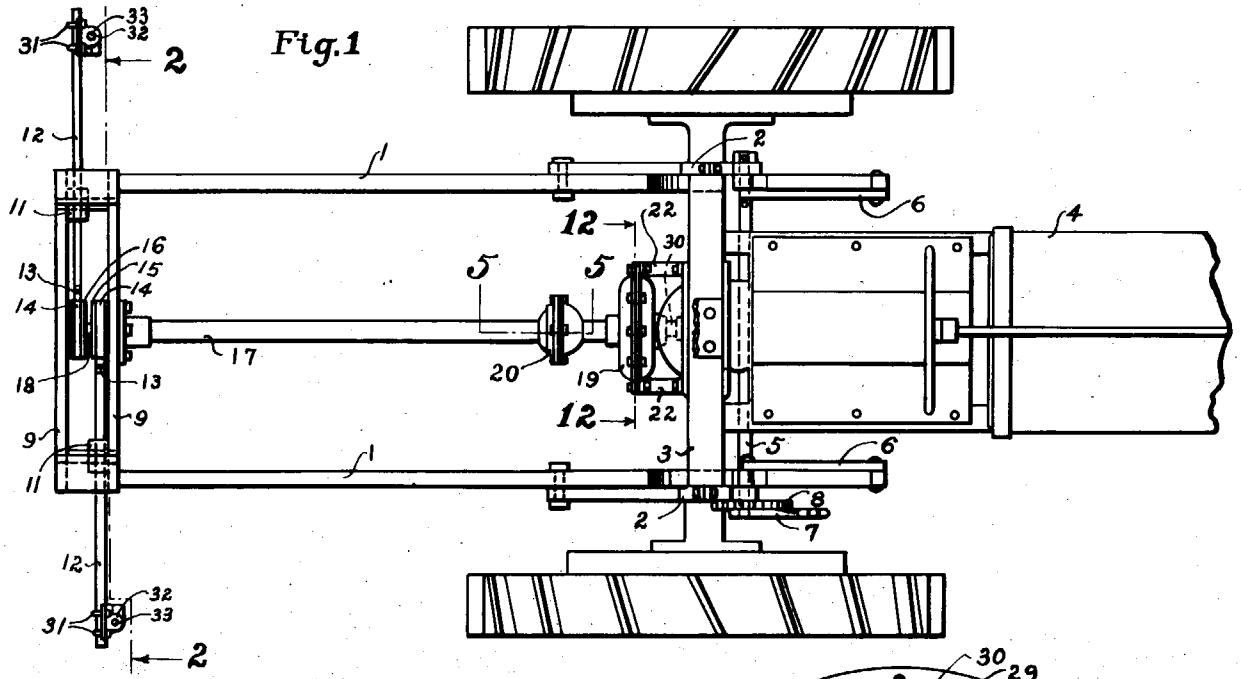
Fig. 1 is a top plan view illustrating the application of the invention.

In accordance with the present invention, the improved dam or water block forming device comprises a suitable frame 1 pivoted at one end to clamps 2 secured about the rear axle 3 of a suitable tractor indicated generally by the reference numeral 4 as shown in Fig. 1. Forwardly of the axle housing 3 there is suitably mounted a shaft 5 to which end extensions at the sides of frame 1 are connected by links or arms 6 in such a manner that by the rocking of the shaft 5 the angle of the frame 1 with respect to the ground may be varied for controlling the digging depth of the tools of the device. For rocking the shaft 5 there is provided a lever 7 attached thereto and locked in adjusted positions by suitable rack and detent means indicated generally by the reference numeral 8.

Extending transversely of the free end of the frame 1 are spaced parallel bars 9—9 between which are pivoted as at 10 guide sleeves 11 in which work rods 12. The rods 12 are connected as at 13 to eccentric straps 14 operating in the grooves of eccentric disks 15 and 16 respectively.

The eccentric disk 15 is eccentrically secured on an outer hollow tubular shaft 17 while the eccentric disk 16 is secured to the end of an inner shaft 18 which protrudes from the end of the tubular shaft 17.

Figure 5:
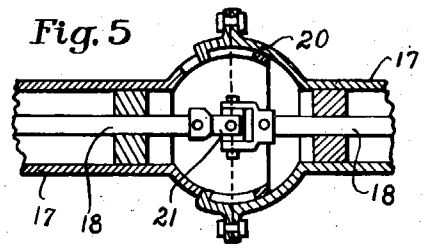
Fig. 5 is a detail sectional view taken substantially on the line 5—5 of Fig. 1.

The shafts 17 and 18 extend from one side of a gear transmission case 19. In this connection and as best shown in Fig. 5, the shafts 17 and 18, respectively, are divided into sections, the sections of the shaft 17 being joined together through the medium of a suitable universal joint 20, while the sections of the shaft 18 are connected together through the medium of a suitable universal joint 21.

The gear case 19 is suitably mounted on the rear axle housing 3 by brackets 22.

Mounted on the ends of the shafts 17 and 18 terminating within the gear casing 19, are gears 23 and 24, respectively.

Figure 12:
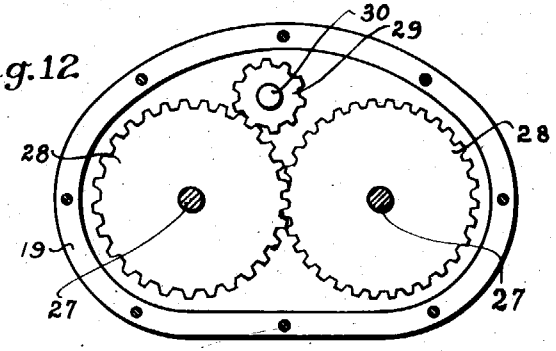
Fig. 12 is a transverse section, partly in elevation, through the gear transmission case, substantially on the line 12—12 of Fig. 1.

The gears 23 and 24, respectively, are in mesh with pinions 25 and 26 respectively secured to shafts 27 suitably journaled in the case 19. Also on the shafts 27 are gears 28 meshing with each other and one of which is in constant mesh with a pinion 29, as shown in Fig. 12, secured on that end of the power take-off shaft 30 of the tractor, which shaft extends into the casing 19, as also shown in Fig. 3. It will thus be seen that drive from the power take-off shaft 30 will be transmitted through the gearing just described to the shafts 17 and 18 for simultaneously rotating the eccentric disks 15 and 16 in reverse directions as indicated by the arrows shown in Fig. 2 for reciprocating the rods 12.

On the end of each rod 12 is clamped as at 31 a head block 32 in which is secured the upper end of a foot or post 33. The lower end of the post 33 is bifurcated as at 34, and is apertured to receive a shovel shank 35. The shank 35 is secured in the bifurcation 34 of the foot 33 through the medium of bolt and nut means 36 and a wooden pin 37, the latter being provided in the event the shovel 38 strikes a hard obstruction, the pin 37 will break or shear off, thus permitting the shank 35 to swing about the bolt 36 as a pivot and thereby prevent breaking of the shovel or its shank or foot 33, as might otherwise result. In this connection, it will be noted that the shovel 38, which is of any suitable shape and design, is secured to its shank 35 through the medium of bolt and nut means 39.

The operation of the device is as follows:

As the tractor draws the device over the ground, drive is transmitted from the power take-off shaft 30 of the tractor to the shovel operating rods 12 through the shafts, gearing and eccentrics in a manner above explained, so that at predetermined intervals the shovels 38 each serves to shovel or scrape the dirt from opposite sides of the respective furrows or trenches 40 thereinto to provide water blocks, checks or dams 41 as clearly shown in Figs. 10 and 11. It is preferable to so time the operation of the shovels that these dams 41 will be provided at, for example, every nine feet throughout the length of the trench. Further, it has been found desirable in making these dams to stagger the same as shown in Fig. 10, that is with the dam in one trench arranged in alternation or staggered relation to the dam in the next adjacent trench.

In Figs. 8 and 9, I have shown a slightly modified form of means for transmitting power from the power take-off shaft to the shovel operating rods 12. In this form of the invention, instead of providing outer and inner shafts such as shafts 17 and 18, I provide a single shaft 42 connected in driving engagement with the power take-off shaft at one end in any suitable manner such as by a suitable train of gearing or the like. At its other end the shaft 42 terminates between the cross bars 9 and at said end is equipped with a pinion 43. In this form of the invention, the eccentric disks 15 and 16 are dispensed with and in their stead are provided gears 44 mounted on suitable shafts 45, journaled in bearings 46, provided on the lower edges of the cross bars 9, as shown in Fig. 8. One of the gears 44, as shown in Fig. 8, is in constant mesh with the pinion 43, and the gears 44 are in mesh one with the other as shown, so that obviously the gears 44 are caused to rotate in unison in opposite directions for driving the several operating rods 12. In this connection, it will be noted that the rods 12 are connected with the gears 44 through the medium of eccentric pins 47. Manifestly, with such a driving gear the shovels will be operated for shoveling or scraping the dirt from opposite sides of the trenches into the trenches for forming the water checks, blocks or dams.

Referring again to the operation of the device, it will be understood that in actual practice the machine will move forward, for best results, at a predetermined speed of approximately three miles per hour and that the reciprocation of the hoes or scrapers will be relatively faster than the forward movement of the machine with the result that the hoes will bring the dirt into the furrows at nearly a right angle to the direction of movement of the machine. In this connection it may be stated however that the angle at which the hoe may travel across the furrow will not materially affect the damming or water block formation, so long as the hoe is properly adjusted to drag the dirt into the furrow.

While I have herein shown and described the preferred embodiments of the invention, it will be understood that changes may be made therein, without departing from the spirit and scope of the invention as hereinafter claimed.

I claim:

1. A machine for building dams in furrows comprising a frame, means for pivotally mounting the frame at one end to the rear of a draft vehicle equipped with a power take-off shaft, means for securing the frame at the desired adjustment relative to ground level, shovels operating laterally of the frame for shoveling dirt from opposite sides of furrows into the furrows to build dams therein, rods to which said shovels are secured, guide means mounted on the frame and with which said rods are slidably engaged, eccentric means connected with said rods to operate the shovels, and means in conjunction with said eccentric means for operating said shovels from the power take-off shaft of the draft vehicle.

2. A machine for building dams in furrows comprising in combination with a draft vehicle having a power take-off shaft, a frame pivotally mounted at one end of the draft vehicle, means for securing the frame at the desired adjustment relative to ground level, oppositely extending rods mounted on said frame for oscillatory movement, shovels on one end of the respective rods, a pair of inner and outer shafts mounted on said frame, power transmission means connecting said inner and outer shafts with said power take-off shaft for driving the inner and outer shafts in reverse directions relative to one another, an eccentric disk on each of said inner and outer shafts, an eccentric strap connecting one of said rods with one of the eccentric disks, and a second eccentric strap connecting the other of said rods with a second one of said eccentric disks, as and for the purpose specified.

3. A machine for building dams in furrows comprising in combination with a draft vehicle equipped with a power take-off shaft, a frame pivotally mounted on the draft vehicle at the rear end of the latter, means for securing the frame at the desired adjustment relative to ground level, oppositely extending rods mounted on said frame for oscillatory movement, shovels on one end of the respective rods, a shaft having an end portion mounted on said frame and a second end portion in driven engagement with the power take-off shaft of the vehicle, a pair of intermeshing gears mounted on said frame, a gear on one end of the driven shaft in mesh with one gear of said pair, and one of said shovel carrying rods having an end eccentrically connected with one gear of said pair, and the other of said shovel carrying rods having an end eccentrically connected with the other gear of said pair, as and for the purpose specified.

4. In a machine for building dams in furrows, the combination of a frame, means for pivotally mounting the frame to a draft vehicle equipped with a power take-off, shovels operating laterally of the frame for shoveling dirt from opposite sides of furrows into the furrows to build dams therein, rods to which said shovels are secured, guide means mounted on the frame and with which said rods are slidably engaged, eccentric means connected with said rods to operate the shovels, and means in conjunction with said eccentric means for operating said shovels from the power take-off shaft of the draft vehicle.

5. In a machine for building dams in furrows, the combination of a frame, means for pivotally mounting the frame to a draft vehicle equipped with a power take-off, shovels operating laterally of the frame for shoveling dirt from opposite sides of furrows into the furrows to build dams therein, rods to which said shovels are secured, guide means mounted on the frame and with which said rods are slidably engaged, and means for operating said shovels from the power take-off shaft of the draft vehicle.

6. In a machine for building dams in furrows, the combination of a frame, means for connecting said frame with a draft vehicle equipped with a power take-off shaft, shovels operating laterally of the frame for shoveling dirt into furrows to build dams therein, rods connected with said shovels, guide means for said rods and mounted on the frame, and means for operating said rods from the power take-off shaft of the draft vehicle.

7. In a machine for building dams in furrows, the combination of a frame, means for connecting said frame with a draft vehicle equipped with a power take-off shaft, shovels operating laterally of the frame for shoveling dirt into furrows to build dams therein, means supporting said shovels for lateral movement relative to the frame, and means for operating said shovels from the power take-off shaft of the draft vehicle.

8. In a machine for building dams in furrows, the combination of a frame, means for connecting said frame with a draft vehicle equipped with a power take-off shaft, one or more dam forming shovels mounted on the frame and movable relative thereto, and means for operating said shovel or shovels from the power take-off shaft of the draft vehicle.

9. In a machine for building dams in furrows, the combination of a draft vehicle having a power take-off shaft, a frame connected with said draft vehicle, one or more dam forming shovels mounted on the frame for movement relative thereto, and means for operating said shovel or shovels from the power take-off shaft of the draft vehicle.

10. In a machine for building dams in furrows, the combination of a frame, rods extending laterally of the frame in opposite directions from the central portion of the frame, swinging guides slidably mounting said rods on the frame, shovels mounted on the outer ends of the rods, and power means connected with the inner end portions of said rods for reciprocating said rods transversely of the frame.

11. In a machine for building dams in furrows, the combination of a draft vehicle having a source of power thereon, a frame connected with said draft vehicle, one or more dam forming elements mounted on the frame for movement relative thereto, and means for connecting said source of power on the draft vehicle with the dam forming element or elements for operating the same.

RUSSELL H. SMITH.